April 21, 1959 M. KAYE 2,882,786
COLOR MEASURING CIRCUIT
Filed Nov. 8, 1954 2 Sheets-Sheet 1

INVENTOR.
Morton Kaye

April 21, 1959

M. KAYE 2,882,786

COLOR MEASURING CIRCUIT

Filed Nov. 8, 1954

INVENTOR.
Morton Kaye

United States Patent Office 2,882,786
Patented Apr. 21, 1959

2,882,786

COLOR MEASURING CIRCUIT

Morton Kaye, South Norwalk, Conn., assignor, by mesne assignments, to The Perkin-Elmer Corporation, Norwalk, Conn., a corporation of New York Application November 8, 1954, Serial No. 467,353

3 Claims. (Cl. 88—14)

This application is a continuation-in-part of my copending application Serial No. 383,067 filed September 29, 1953, and now abandoned, for improvements in Color Measuring Circuit which application will now be permitted to lapse without prejudice in view of its being superseded by this present application.

This invention relates to means for analyzing color and has particular reference to measuring color by electrical means.

Several methods are known to determine color in numerical terms. The spectrographic method for instance, widely used for color determination involves the steps of point by point measurement of the spectral content of the sample to be analyzed. In practice, a minimum of thirty points must be measured. Then, after weighting of the test points obtained, a curve can be plotted which is followed by mathematical integration. Finally, the $x$ and $y$ trichomatic coefficients of the I.C.I. (International Commission on Illumination) chromaticity diagram are calculated.

This method, while most accurate, is very time consuming and requires scientific skill and training of the personnel performing this color analysis.

Another method frequently employed is the tristimulus colorimetry. In this method color samples are matched visually by passing light through three color filters. The amount of light through each color filter is carefully recorded and then the $x$ and $y$ coefficients of the chromaticity diagram are calculated in the usual manner. This system similar as the method described above, requires tedious work and scientific training, especially for the mathematical portion of the analysis.

A third well known method, employing photo-electric means and three color filters, measures the color responsive electrical signals generated by the primary color components of the sample under analysis. In the ensuing step, the $x$ and $y$ coefficients are calculated in the very same manner as in the aforementioned other methods.

All of the three methods described and most widely employed provide after extensive calculations results in terms of the chromaticity diagram of the I.C.I system. Aside from the burdensome calculations which are necessary, several distinct disadvantages become apparent.

Nearly neutral colors have I.C.I. coordinates which are very close for two samples which might be diametrically opposite in hue. Also, the direction and amount of a color difference between two samples is not evident upon inspection of the $x$ and $y$ coefficients. The I.C.I. data, moreover, do not express color in terms which would enable personnel inexperienced in the I.C.I. system to identify color. While the dominant wavelength of the color may be calculated from the I.C.I. coordinates, it represents a source of error and the order of accuracy is comparatively low.

Practice has shown that it is more convenient to express color in terms of dominant wavelength or hue. These latter terms overcome all of the difficulties enumerated above, because nearly neutral colors which have close I.C.I. coordinates may have hues or dominant wavelengths which are widely separated and therefore more readily distinguished. Furthermore, the direction and amount of color difference between two color samples is implicit in the statement of their hue or dominant wavelength. Still further, defining a color in terms of hue or dominant wavelength enables the untrained person to visualize the color.

One of the objects of this invention is to provide an improved color measuring circuit which avoids one or more of the disadvantages and limitations of prior art arrangements.

Another object of the invention is to provide a color measuring circuit using electrical means for convenient, rapid and instantaneous color determination.

Another objective of the invention is providing a color measuring circuit which determines color without the use of mathematical calculations.

Still another object of the invention is the provision of a color measuring circuit which readily can be operated by production as well as laboratory personnel.

A further object of the invention is the provision of a color measuring device which provides a numerical value of color in terms of dominant wavelength or hue.

Another object of the invention is to provide a rapid color measuring circuit which reveals color analysis in terms of dominant wavelength or hue, in terms of purity or saturation and in terms of total luminance, total luminosity, total reflectance or total transmittance.

A still further object of the invention is the provision of a color measuring device which by virtue of its instantaneous determination of three basic color parameters is adapted for continuous production processes.

One feature of the invention includes a color measuring circuit which comprises means for converting color which is to be measured into unipotential electrical signals. These electrical signals are converted into periodically changing electrical signals and means are provided for effecting a phase difference between these periodically changing electrical signals. A mixing circuit is arranged for obtaining a resultant periodically changing electrical signal.

For a better understanding of the present invention, together with other and further objects thereof, reference is made to the following description taken in connection with the accompanying drawings in which.

Figure 1:
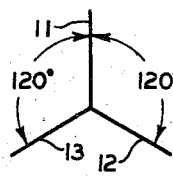
Figure 1 is a vector diagram used for explaining certain features of the underlying theory.

Referring now to Figure 1, three vectors of equal length 11, 12 and 13 are shown, each phase shifted 120 degrees from the other. It is well known that in this condition their vector sum is zero. Now, when one of the vectors is omitted and the remaining vectors are of differing magnitude, the vector sum or resultant vector is approximately equal to the larger vector and the angle thereof depends upon the relative length of the two vectors. The only factor affecting the length of the resultant vector is the addition of the original third vector quantity. The longer the third vector, the shorter the resultant of the two remaining vectors. A similar condition prevails in color measurement, namely the more of a third primary color is present, the less pure the color.

If the vectors are used to represent three primary colors, the following corollaries may be drawn:

a. The hue or dominant wavelength of a color may be represented by the angle of the resultant vector;

b. The purity or saturation of the color may be represented by the ratio between the length of the resultant vector and the longest primary vector; and c. Total luminosity, total luminance, total reflectance or total transmittance may be represented by the arithmetic sum of the primary vectors.

Figure 2:
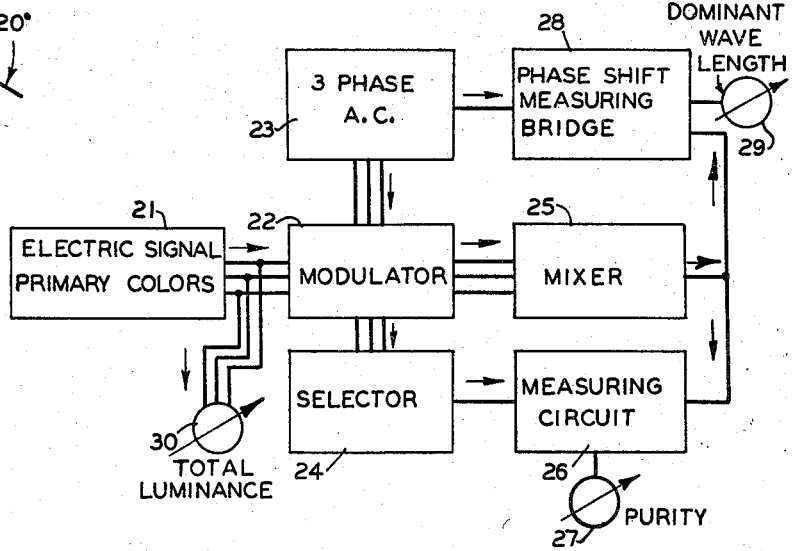
Figure 2 is a schematic block diagram of one embodiment of the invention.

Figure 2 is a block diagram of a circuit which may be used to accomplish the color analysis based on the vector principle explained above. Numeral 21 identifies a photo-electric means for generating three electrical signals responsive to the three primary color components of the color sample under analysis. Each of these three color responsive electrical signals modulates in a modulator 22 one phase of a three phase alternating current generator 23, thus obtaining three modulated alternating current signals which are 120 degrees phase shifted with respect to one another. A selector circuit 24 connected to the modulator is adapted to select that modulated signal which is characterized by the largest amplitude. A mixer circuit 25 combines the three modulated and phase shifted signals to cause a single resultant signal which is the vector sum of the three modulated signals. The amplitude of this resultant signal is compared with the amplitude of the selected modulated signal in a measuring circuit 26, thereby obtaining a measure of purity or saturation of the color which is being analyzed. The numerical values are rendered apparent on an indicating means 27. A phase shift measuring bridge circuit 28 is used to determine the phase angle of the resultant signal with respect to the primary source of phase shift, namely the three phase power supply 23. This phase angle being a measure of the dominant wavelength or hue becomes apparent on an indicating means 29. The arithmetic sum of the three primary color responsive signals, being a measure of total luminance, total luminosity, total reflectance or total transmittance, is read on an indicating means 30. As explained above, the three color parameters thus obtained suffice for clear and concise color identification.

Figure 3:
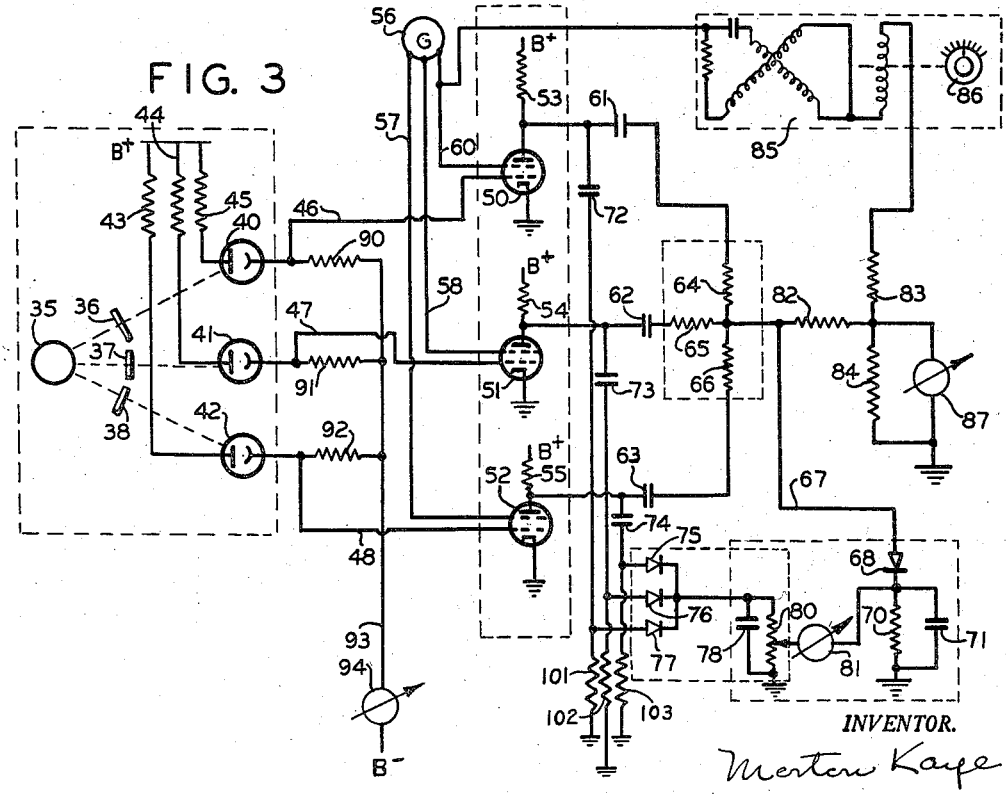
Figure 3 is a schematic circuit diagram of the embodiment shown in Figure 2.

The above explained block diagram may be compared with Figure 3 in which photo-electric tubes 40, 41 and 42 receive light from the color sample 35 via a set of three primary color light filters 36, 37 and 38. Each photo-electric tube receives one of the primary colors and thus generates an electric signal which is responsive to the intensity of the respective primary color. Each of the tubes is connected to an anode power supply via anode resistors 43, 44 and 45 respectively. The current through each of the resistors 90, 91 and 92 is proportional to the amount of light which strikes the associated photo-electric tube. Conductor 93 provides a common junction for these resistors and thus the three individual photo-responsive signals are added to yield their arithmetic sum rendered visible on an indicating means 94. This indicating meter may be calibrated in total luminance, total luminosity, total reflectance or total transmittance, depending upon the type of color sample under analysis.

Three multi-grid electronic tubes 50, 51 and 52 together with their respective anode resistors 53, 54 and 55 are used as modulating means, each tube for one of the primary colors. The lower grids of the modulator tubes are connected to the cathode of an associated photo-electric tube via conductors 46, 47 and 48 respectively, while the upper grids are connected to a source of three-phase alternating voltage 56 via conductors 57, 58 and 60 respectively. In this manner three alternating current output signals are obtained, their amplitudes being dependent upon the amplitude of the direct current signal of the associated photo-electric tube. By virtue of the three-phase power supply 56, the modulated signals are phase shifted 120 degrees with respect to one another.

Resistors 64, 65 and 66 constituting a mixing network, are connected to the modulator tubes via blocking capacitors 61, 62 and 63 to render a single modulated signal which is the resultant in phase and amplitude of the three primary color responsive modulated signals. The phase angle of this resultant signal is compared with the primary source of phase shift, i.e. the power supply 56, by means of a phase shift measuring bridge, such as the Helmholtz type bridge 85, connected in series with resistors 82 and 83. Alternating current voltmeter 87 connected across resistance 84 provides a convenient "null" or "maximum" indicating means to establish when the phase angle on bridge 85, and indicated on adjusting dial 86, coincides with the phase angle of the resultant signal. Dial 86 therefore, may be calibrated to indicate dominant wavelength or hue.

A selector circuit which includes rectifier diodes 75, 76 and 77 is connected to the modulator tubes via blocking capacitors 72, 73 and 74, and is adapted to select the modulated signal having the largest amplitude by virtue of the bias generated across resistance 80, a comparatively large resistor. The resistor is in parallel with a filter capacitor 78. In order to compare the amplitude of this selected signal with the amplitude of the resultant modulated signal, the resultant signal appearing at the junction of resistors 64, 65 and 66, a rectifier 68 is connected to this junction via conductor 67 and connected serially with the parallel combination of resistor 70 and filter capacitor 71. This arrangement permits that the two amplitude signals may be compared in terms of direct current volage.

Resistors 101, 102 and 103 connected to ground serve to discharge capacitors 72, 73 and 74 respectively during the non-conductive part of the A.-C. cycle which is applied on the rectifier means 75, 76 and 77.

Resistor 70, adjustable resistor 80 and voltmeter 81 form a conventional voltage comparing circuit. When adjusting the slider on resistor 80 until the meter reads zero, a dial (not shown) cooperating with the slider can be calibrated to read the ratio of voltage appearing on resistor 70 to the voltage on resistor 80. For the instant application the dial may be calibrated in percent purity or saturation which, as has been explained, is related to the amplitude ratio of resultant vector to largest color responsive signal.

In order to compensate for non-uniformities among the plurality of photo-electric means, for the light transmitting characteristics of the optical filters, etc. it will be advantageous to adjust the amplitudes of the alternating current voltage signals applied to the grids of the modulator tubes 50, 51 and 52 in such a manner than the three modulated output signals are of equal amplitude when testing a neutral color specimen. Such a measurement will serve as a convenient calibrating means.

It will be obvious to those skilled in the art that the modulator means, the mixing and the selecting circuits illustrated and described are merely examples and that many other circuits are known which will perform the modulating, selecting and mixing functions in an equally satisfactory manner. Cathode follower type modulation or variable inductance modulation may be used, to mention but a few of the types. Still further, many photo-electric circuits are known to achieve electrical signals responsive to the light intensity of colors. Various vacuum tube circuits, phase splitting circuits, three-phase alternating current generators, etc. may be employed to obtain three voltages 120 degrees shifted in phase angle. In an analogous manner the Helmholtz bridge may be replaced by various other phase shift meters and phase angle measuring circuits.

It furthermore will be apparent to those skilled in the art that the total luminance can also be measured by rectifying the output signals of modulator tubes 50, 51 and 52 separately and then adding the rectified signals by known methods instead of measuring the total luminance directly after the photo-electric means as shown in Figure 3. Still further it is possible first to modulate an alternating current voltage with the photo responsive signals and subsequently effect a phase difference between the modulated signals instead of the single step method shown and described in connection with Figures 2 and 3.

Figure 4:
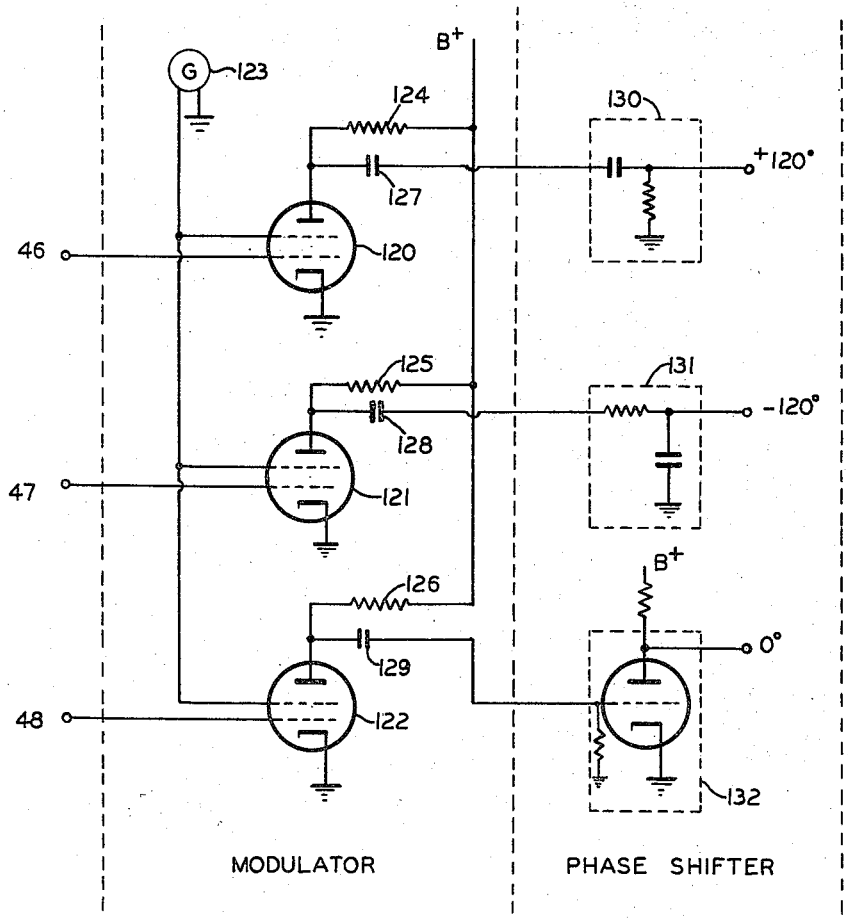
Figure 4 is a schematic circuit diagram showing a certain modification of a portion of Figure 3.

This modification is indicated in Figure 4. Electron tubes 120, 121 and 122 again serve as modulating means. The anode of each tube is connected to a common B+ supply via individual plate resistors 124, 125 and 126 respectively. One control electrode of each electron tube is connected to a source of single phase alternating current 123. The other control electrode of each tube is connected to one associated photoelectric tube 40, 41 and 42 (Figure 3) by means of conductors 46, 47 and 48 respectively. Each modulating tube therefore, produces an alternating current output signal whose amplitude is dependent upon the amplitude of the associated direct current signal. These modulated output signals are all in phase shift, three phase shifters 130, 131 and 132 are employed. Phase shifters 130 and 131 are resistance-capacitance networks which are commonly used to obtain phase shifted signals. Phase shifter 132 is a vacuum tube stage, and as it is well known there is an 180 degree phase shift between the signal at the grid and the signal at the anode. Assuming the signals at the grid of tubes 120, 121, and 122 at zero degrees, the signals at the plates are shifted 180 degrees and the tube of stage 132 causes another 180 degree shift. Phase shifters 130 and 131 are dimensioned such as to cause a plus 60 degree and a minus 60 degree shift. Capacitors 127, 128 and 129 are coupling capacitors between the modulator and the phase shifting section. The resulting phase shifted signals are applied to the mixer and selector circuits as shown in Figure 3.

In another modification it is possible to select the photo responsive signal having the largest amplitude prior to modulation instead of using the method shown.

These are but a few of the modifications and substitutions which readily can be made without departing from the broad principle of the color measuring circuit disclosed.

For the definition of the color terms used and colorimetry in general, reference is made to the book "Color in Business, Science and Industry" by Deane B. Judd, John Wiley & Sons, Inc., New York, New York, 1952.

While there have been described and illustrated certain specific embodiments of the invention, it will be obvious to those skilled in the art that various changes and modifications may be made therein without departing from the field and from the broad scope of the invention which should be limited only by the scope of the appended claims.

What is claimed is:

1. An electrical color measuring circuit comprising a source of A.C. signal, means for producing three versions of said A.C. signal, each being modulated in accordance with the amount of a primary color contained in the color to be measured, means for shifting the phase of said modulated signals to produce equally time displaced three-phase signals, means for combining said three modulated signals to produce a resultant signal, and means for measuring the phase of said resultant signal for indicating the hue of the color to be measured.

2. An electrical color measuring circuit comprising a source of A.C. signal, means for producing three versions of said A.C. signal, each being modulated in accordance with the amount of a primary color contained in the color to be measured, means for adding said primary color signals for indicating the total luminosity of the color being measured, means for shifting the phase of said modulated signals to produce equally time displaced three-phase signals, means for combining said three modulated signals to produce a resultant signal, and means for measuring the phase of said resultant signal for indicating the hue of the color to be measured.

3. An electrical color measuring circuit comprising a source of A.C. signal, means for producing three versions of said A.C. signal, each being modulated in accordance with the amount of a primary color contained in the color to be measured, means for shifting the phase of said modulated signals to produce equally time displaced three-phase signals, means for combining said three modulated signals to produce a resultant signal, means for measuring the phase of said resultant signal for indicating the hue of the color to be measured, and means for comparing the amplitude of the largest of said primary color signals with said resultant signal for indicating the purity of the color being measured.

References Cited in the file of this patent

UNITED STATES PATENTS

| 2,046,714 | Wilson et al. | July 7, 1936 |
| 2,152,645 | Holven et al. | Apr. 4, 1939 |
| 2,162,529 | Dawson et al. | June 13, 1939 |
| 2,219,676 | Barber | Oct. 29, 1940 |
| 2,244,826 | Cox | June 10, 1941 |
| 2,547,212 | Jamison et al. | Apr. 3, 1951 |
| 2,561,219 | Nyman | July 17, 1951 |
| 2,685,063 | Alsberg | July 27, 1954 |
| 2,696,750 | Hunter | Dec. 14, 1954 |
| 2,706,274 | Boyer | Apr. 12, 1955 |

FOREIGN PATENTS

| 687,405 | Germany | Jan. 29, 1940 |